(12) United States Patent
McDuff et al.

(10) Patent No.: US 9,394,932 B2
(45) Date of Patent: *Jul. 19, 2016

(54) ANCHOR ASSEMBLY FOR FASTENER

(71) Applicant: Cobra Fixations Cie Ltee-Cobra Anchors Co., Ltd., Montreal (CA)

(72) Inventors: Pierre McDuff, Outremont (CA); Alexandre Pollak, Laval (CA); Lang Nguyen, Dollard-des-Ormeaux (CA)

(73) Assignee: Cobra Fixations Cie Ltee.-Cobra Anchors Co. Ltd., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,025

(22) Filed: Nov. 5, 2012

(65) Prior Publication Data

US 2013/0243546 A1    Sep. 19, 2013

Related U.S. Application Data

(63) Continuation of application No. 11/886,941, filed as application No. PCT/CA2006/000419 on Mar. 21, 2006, now Pat. No. 8,303,224.

(60) Provisional application No. 60/685,498, filed on May 31, 2005.

(30) Foreign Application Priority Data

Mar. 21, 2005   (CA) .................................. 2502044

(51) Int. Cl.
   *F16B 21/00*   (2006.01)
   *F16B 13/08*   (2006.01)
   (Continued)

(52) U.S. Cl.
   CPC ........... *F16B 13/0808* (2013.01); *F16B 13/003* (2013.01); *F16B 45/00* (2013.01)

(58) Field of Classification Search
   CPC ..... F16B 13/0808; F16B 13/003; F16B 45/00
   USPC .................................................. 411/340–342
   See application file for complete search history.

(56) References Cited

U.S. PATENT DOCUMENTS

| 147,343 A | 2/1874 | Miles |
| 165,206 A | 7/1875 | Brown |

(Continued)

FOREIGN PATENT DOCUMENTS

| CA | 1164333 A1 | 3/1984 |
| CA | 2252173 A1 | 4/2000 |

(Continued)

OTHER PUBLICATIONS

International Search Report for PCT/CA2004/000311 mailed Jul. 14, 2004.

(Continued)

*Primary Examiner* — Gary Estremsky
(74) *Attorney, Agent, or Firm* — Nixon Peabody LLP

(57) ABSTRACT

An anchor assembly for walls comprises a toggle member and a strap member pivotally mounted together, and a locking member. In a first position, the toggle member is aligned with the strap member for insertion through a hole in the wall, whereas in a second position, the toggle member extends behind the wall angularly to the strap member which extends from the toggle member through the hole. The locking member is adapted to be displaced along the strap member until it engages the wall and to be locked on the strap member to prevent the locking member from displacing away from the toggle member. Therefore, the locking member and the toggle member are connected by the strap member and imprison the wall by abutting respectively the visible and hidden sides thereof. A fastener introduced through the locking member and wall threadably engages an opening defined in the toggle member.

9 Claims, 19 Drawing Sheets

(51) Int. Cl.
*F16B 13/00* (2006.01)
*F16B 45/00* (2006.01)

(56) References Cited

U.S. PATENT DOCUMENTS

| | | | |
|---|---|---|---|
| 365,725 A | 6/1887 | Buckland | |
| 600,255 A | 3/1898 | Breul | |
| 738,074 A | 9/1903 | Schick | |
| 739,512 A | 9/1903 | Stannard | |
| 745,722 A | 12/1903 | Jung | |
| 1,100,170 A | 6/1914 | Brosius | |
| 1,115,800 A | 11/1914 | Froberg | |
| 1,132,414 A | 3/1915 | White | |
| 1,159,420 A | 11/1915 | Rubly | |
| 1,161,268 A | 11/1915 | Tuck | |
| 1,185,587 A | 5/1916 | Bragg | |
| 1,210,610 A | 1/1917 | Dehn | |
| 1,333,692 A | 3/1920 | Wester | |
| 1,389,540 A | 8/1921 | Washington | |
| 1,409,291 A | 3/1922 | Giroux | |
| 1,573,557 A | 2/1926 | Alexander | |
| 1,637,981 A | 8/1927 | Baldwin | |
| 1,670,398 A | 5/1928 | Silvino | |
| 1,676,197 A | 7/1928 | Marrinan | |
| 1,780,474 A | 11/1930 | Glazer | |
| 1,802,934 A | 4/1931 | Balch | |
| 1,999,575 A | 4/1935 | Reuter et al. | |
| 2,193,306 A | 3/1940 | Tinnerman | |
| 2,282,631 A | 5/1942 | Winship | |
| 2,339,841 A | 1/1944 | Deuchler et al. | |
| D170,196 S | 8/1953 | Gries | |
| 2,698,470 A | 1/1955 | Buedingen | |
| 2,751,807 A | 6/1956 | Harre | |
| 2,883,946 A | 4/1959 | Kleef | |
| 2,908,196 A | 10/1959 | Apfelzweig | |
| 2,916,235 A | 12/1959 | Nagel | |
| 3,020,602 A | 2/1962 | Siering | |
| 3,127,807 A | 4/1964 | Modrey | |
| 3,143,915 A | 8/1964 | Tendler | |
| 3,248,994 A | 5/1966 | Mortensen | |
| 3,268,195 A | 8/1966 | Hoffman | |
| 3,282,547 A | 11/1966 | Ables | |
| 3,288,014 A | 11/1966 | Aackersberg | |
| 3,298,651 A | 1/1967 | Passer | |
| 3,302,508 A | 2/1967 | Topf | |
| 3,385,156 A | 5/1968 | Polos | |
| 3,547,389 A | 12/1970 | Mitchell | |
| 3,605,547 A | 9/1971 | Millet | |
| 3,618,447 A | 11/1971 | Goins | |
| 3,645,163 A | 2/1972 | Byland | |
| 3,707,898 A | 1/1973 | Holly | |
| 3,752,030 A | 8/1973 | Steurer | |
| 3,861,631 A | 1/1975 | Shorin | |
| 3,879,006 A | 4/1975 | Staudte, Jr. | |
| 3,891,176 A | 6/1975 | Downing et al. | |
| 3,895,773 A | 7/1975 | Solo | |
| 3,912,211 A | 10/1975 | Topf | |
| 3,926,394 A | 12/1975 | Mauceri et al. | |
| 3,966,157 A | 6/1976 | Corral et al. | |
| 4,043,245 A * | 8/1977 | Kaplan | 411/346 |
| 4,075,924 A * | 2/1978 | McSherry et al. | 411/112 |
| 4,103,854 A | 8/1978 | Pliml et al. | |
| 4,120,231 A | 10/1978 | Neumayer | |
| 4,181,061 A | 1/1980 | McSherry | |
| 4,196,883 A | 4/1980 | Einhorn et al. | |
| D259,700 S | 6/1981 | Chasen | |
| 4,274,324 A | 6/1981 | Giannuzzi | |
| 4,285,264 A | 8/1981 | Einhorn | |
| 4,286,497 A * | 9/1981 | Shamah | 411/342 |
| 4,294,156 A | 10/1981 | McSherry et al. | |
| 4,300,745 A | 11/1981 | Peterson | |
| 4,325,528 A | 4/1982 | Martin | |
| 4,406,108 A | 9/1983 | Beck et al. | |
| 4,422,608 A | 12/1983 | Hogg | |
| 4,432,683 A | 2/1984 | Polos | |
| 4,485,995 A | 12/1984 | Hogg | |
| 4,509,713 A | 4/1985 | Hogg | |
| 4,573,844 A * | 3/1986 | Smith | 411/340 |
| 4,613,108 A | 9/1986 | Sundstrom et al. | |
| 4,616,968 A * | 10/1986 | Giannuzzi | 411/342 |
| 4,619,430 A | 10/1986 | Hogg | |
| 4,650,386 A | 3/1987 | McSherry et al. | |
| 4,664,350 A | 5/1987 | Dodds et al. | |
| 4,697,969 A | 10/1987 | Sparkes | |
| 4,719,917 A | 1/1988 | Barrows et al. | |
| 4,821,992 A | 4/1989 | Johnson | |
| 4,822,226 A | 4/1989 | Kennedy | |
| 4,828,439 A | 5/1989 | Giannuzzi | |
| D301,975 S | 7/1989 | Mullen | |
| 4,865,501 A * | 9/1989 | Ferris | 411/340 |
| 4,871,140 A | 10/1989 | Hoskinson et al. | |
| 5,028,030 A | 7/1991 | Lewis | |
| 5,048,788 A | 9/1991 | Lorincz | |
| 5,059,077 A | 10/1991 | Schmid | |
| 5,067,864 A | 11/1991 | Dewey et al. | |
| 5,149,037 A | 9/1992 | Smith | |
| 5,215,418 A | 6/1993 | Trainer et al. | |
| 5,221,169 A | 6/1993 | McSherry et al. | |
| 5,226,767 A * | 7/1993 | Foerster, Jr. | 411/340 |
| 5,236,293 A | 8/1993 | McSherry et al. | |
| D339,980 S | 10/1993 | Sheehan | |
| 5,267,718 A | 12/1993 | Sheehan | |
| 5,267,719 A | 12/1993 | Keller | |
| 5,308,203 A | 5/1994 | McSherry et al. | |
| 5,322,401 A | 6/1994 | Vernet | |
| 5,437,429 A | 8/1995 | Atlas | |
| 5,447,005 A | 9/1995 | Giannuzzi | |
| 5,529,449 A | 6/1996 | McSherry et al. | |
| 5,536,121 A | 7/1996 | McSherry | |
| 5,584,462 A | 12/1996 | Reese | |
| 5,596,792 A | 1/1997 | Shelton | |
| D378,052 S | 2/1997 | Perreault | |
| D381,892 S | 8/1997 | Porter et al. | |
| 5,702,218 A | 12/1997 | Onofrio | |
| 5,725,302 A | 3/1998 | Sirkin | |
| 5,752,792 A | 5/1998 | McSherry | |
| 5,755,545 A | 5/1998 | Banks | |
| 5,833,415 A | 11/1998 | McSherry | |
| D404,287 S | 1/1999 | Hepworth | |
| 5,876,169 A | 3/1999 | Wrigley | |
| 5,878,988 A | 3/1999 | Rakower | |
| 5,881,982 A | 3/1999 | Hollingsworth et al. | |
| D409,082 S | 5/1999 | Donahue | |
| 5,944,295 A | 8/1999 | McSherry | |
| D417,385 S | 12/1999 | Bries et al. | |
| 6,036,149 A | 3/2000 | Del Pino et al. | |
| D424,816 S | 5/2000 | Snell | |
| 6,126,126 A | 10/2000 | McKiernan, Jr. | |
| 6,213,701 B1 * | 4/2001 | Ukai | 411/345 |
| 6,250,865 B1 | 6/2001 | McSherry | |
| 6,279,862 B1 | 8/2001 | Gershowitz | |
| D457,419 S | 5/2002 | McSherry et al. | |
| 6,419,436 B1 | 7/2002 | Gaudron | |
| 6,431,510 B1 | 8/2002 | Lydecker et al. | |
| 6,435,789 B2 | 8/2002 | Gaudron | |
| D462,895 S | 9/2002 | Gaudron | |
| 6,457,926 B1 | 10/2002 | Pope | |
| D473,451 S | 4/2003 | Goodman et al. | |
| D480,292 S | 10/2003 | Johansson et al. | |
| D480,625 S | 10/2003 | Snell | |
| D486,057 S | 2/2004 | Chen | |
| 6,695,276 B2 | 2/2004 | Skorka | |
| D493,699 S | 8/2004 | Goodman et al. | |
| D494,452 S | 8/2004 | Sheldon et al. | |
| 6,821,069 B2 * | 11/2004 | Ikuta | 411/344 |
| 6,830,228 B2 | 12/2004 | Ernst | |
| 6,884,012 B2 * | 4/2005 | Panasik | 411/342 |
| 6,969,220 B2 | 11/2005 | Anquetin | |
| D515,911 S | 2/2006 | McDuff | |
| D516,412 S | 3/2006 | McDuff | |
| 7,160,074 B2 | 1/2007 | Ernst et al. | |
| D554,481 S | 11/2007 | Newbould et al. | |
| D554,483 S | 11/2007 | Hager et al. | |
| D557,595 S | 12/2007 | Ernst et al. | |

(56) References Cited

U.S. PATENT DOCUMENTS

| | | | |
|---|---|---|---|
| 7,320,569 | B2 | 1/2008 | Kaye et al. |
| D566,532 | S | 4/2008 | Wolff |
| 7,395,998 | B2 | 7/2008 | Peterson |
| D593,141 | S | 5/2009 | Gaudron |
| 7,540,458 | B2 | 6/2009 | Forbes |
| 7,547,171 | B2 | 6/2009 | McDuff |
| D596,930 | S | 7/2009 | Gaudron |
| D605,933 | S | 12/2009 | Gaudron |
| D607,311 | S | 1/2010 | Snider |
| 7,694,401 | B2 | 4/2010 | Peterson |
| 7,713,013 | B2 | 5/2010 | Sedgwick et al. |
| D626,403 | S | 11/2010 | Portz |
| D630,088 | S | 1/2011 | Kim |
| D630,089 | S | 1/2011 | Kim |
| D635,843 | S | 4/2011 | McDuff et al. |
| D636,256 | S | 4/2011 | McDuff et al. |
| D642,900 | S | 8/2011 | McDuff et al. |
| D649,022 | S | 11/2011 | McDuff et al. |
| D649,023 | S | 11/2011 | McDuff et al. |
| D649,436 | S | 11/2011 | McDuff et al. |
| D649,437 | S | 11/2011 | McDuff et al. |
| D649,438 | S | 11/2011 | McDuff et al. |
| D649,439 | S | 11/2011 | McDuff et al. |
| D650,261 | S | 12/2011 | McDuff et al. |
| 8,303,224 | B2 | 11/2012 | McDuff et al. |
| 2001/0046429 | A1 | 11/2001 | Gaudron |
| 2002/0015629 | A1 | 2/2002 | Ito |
| 2002/0171017 | A1 | 11/2002 | McKeirnan et al. |
| 2004/0170486 | A1 | 9/2004 | DeMeo |
| 2006/0134375 | A1 | 6/2006 | Peterson |
| 2006/0182517 | A1 | 8/2006 | McDuff |
| 2007/0124910 | A1 | 6/2007 | Peterson et al. |
| 2007/0235622 | A1 | 10/2007 | Baran et al. |
| 2008/0115343 | A1 | 5/2008 | Peterson |
| 2008/0253860 | A1 | 10/2008 | McDuff et al. |
| 2009/0003962 | A1 | 1/2009 | McDuff et al. |
| 2009/0269158 | A1 | 10/2009 | McDuff et al. |
| 2010/0005756 | A1 | 1/2010 | McDuff et al. |
| 2012/0001039 | A1 | 1/2012 | McDuff et al. |
| 2012/0001040 | A1 | 1/2012 | McDuff et al. |

FOREIGN PATENT DOCUMENTS

| | | |
|---|---|---|
| CA | 2458320 A1 | 8/2004 |
| CA | 2420718 | 9/2004 |
| CH | 491296 | 5/1970 |
| CN | 1384293 A | 12/2002 |
| CN | 2572104 Y | 9/2003 |
| CN | 2623930 Y | 7/2004 |
| CN | 200961609 Y | 10/2007 |
| DE | 1296883 B | 6/1969 |
| DE | 10051987 A1 | 5/2002 |
| EP | 0713981 A1 | 5/1996 |
| JP | 7174124 A | 7/1995 |
| JP | 2003531344 A | 10/2003 |
| WO | 96/02170 | 2/1996 |
| WO | 96/16273 | 5/1996 |
| WO | 9905419 A1 | 2/1999 |
| WO | 2004079209 A1 | 9/2004 |

OTHER PUBLICATIONS

International Search Report for PCT/CA2006/000419 mailed Jul. 6, 2006.

International Search Report for PCT/CA2006/000428 mailed Jul. 13, 2006.

International Search Report for PCT/US2003/039974 mailed Jul. 16, 2004.

Office Action mailed May 8, 2009 in Chinese Application No. CN 2006800138128, with English translation.

Office Action mailed Sep. 6, 2011 in Japanese Application No. JP 2008-502203, with English translation.

International Search Report for PCT/CA2009/001572 mailed Jan. 15, 2010.

International Search Report for PCT/CA2009/001669 mailed Feb. 3, 2010.

Chinese Patent Office, Office Action in CN 201310496362.X mailed Apr. 27, 2015 (12 pages); English translation not available.

* cited by examiner

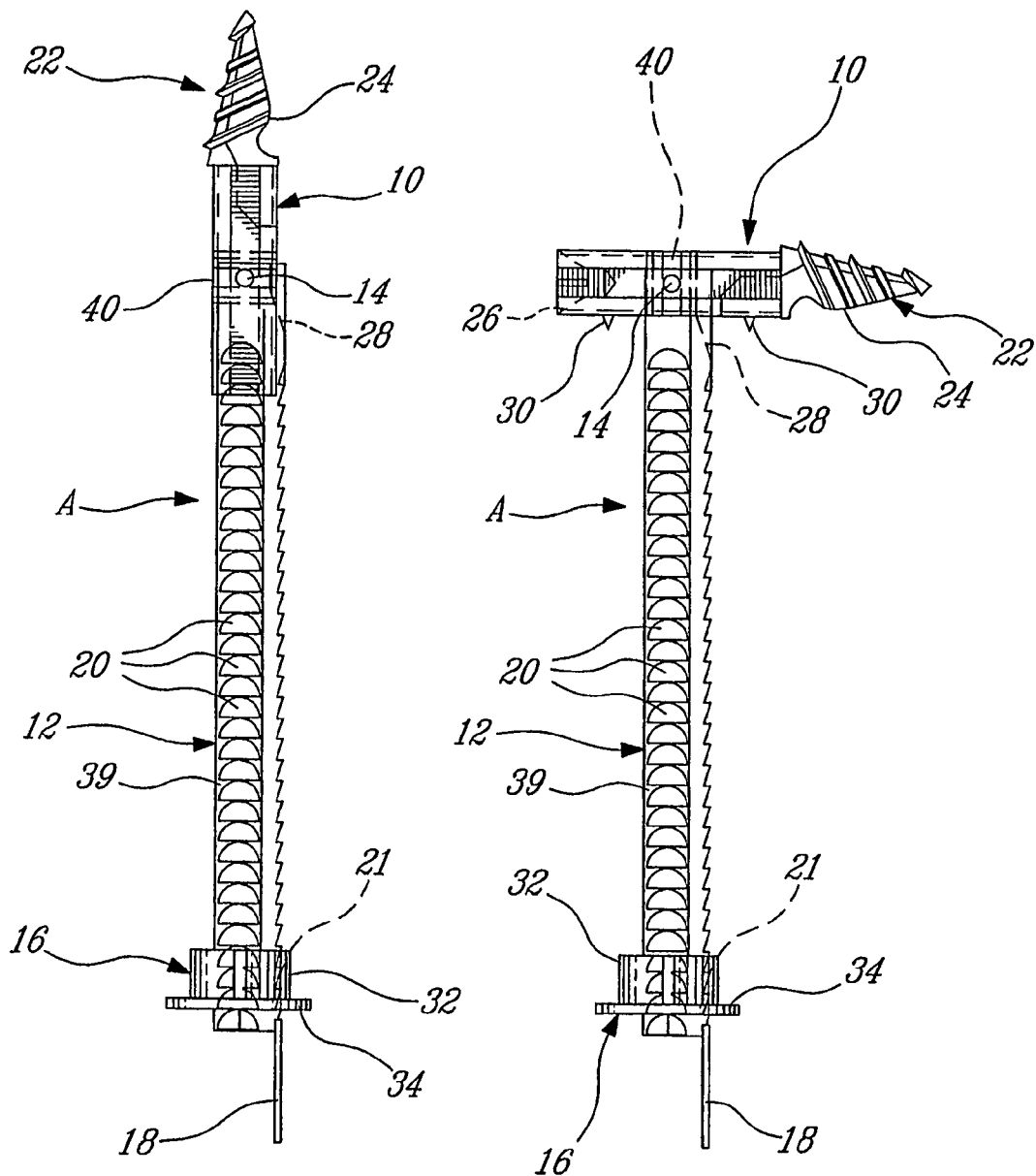

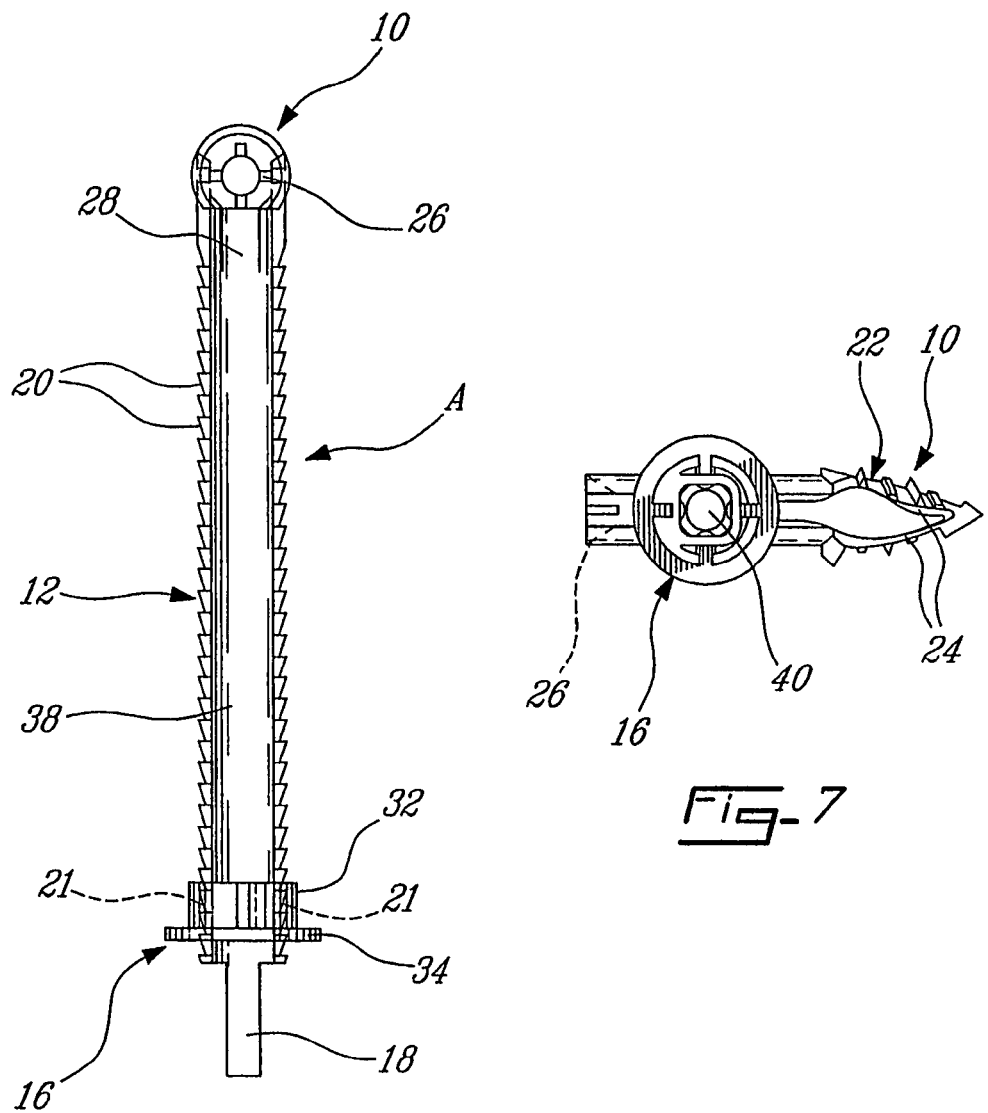

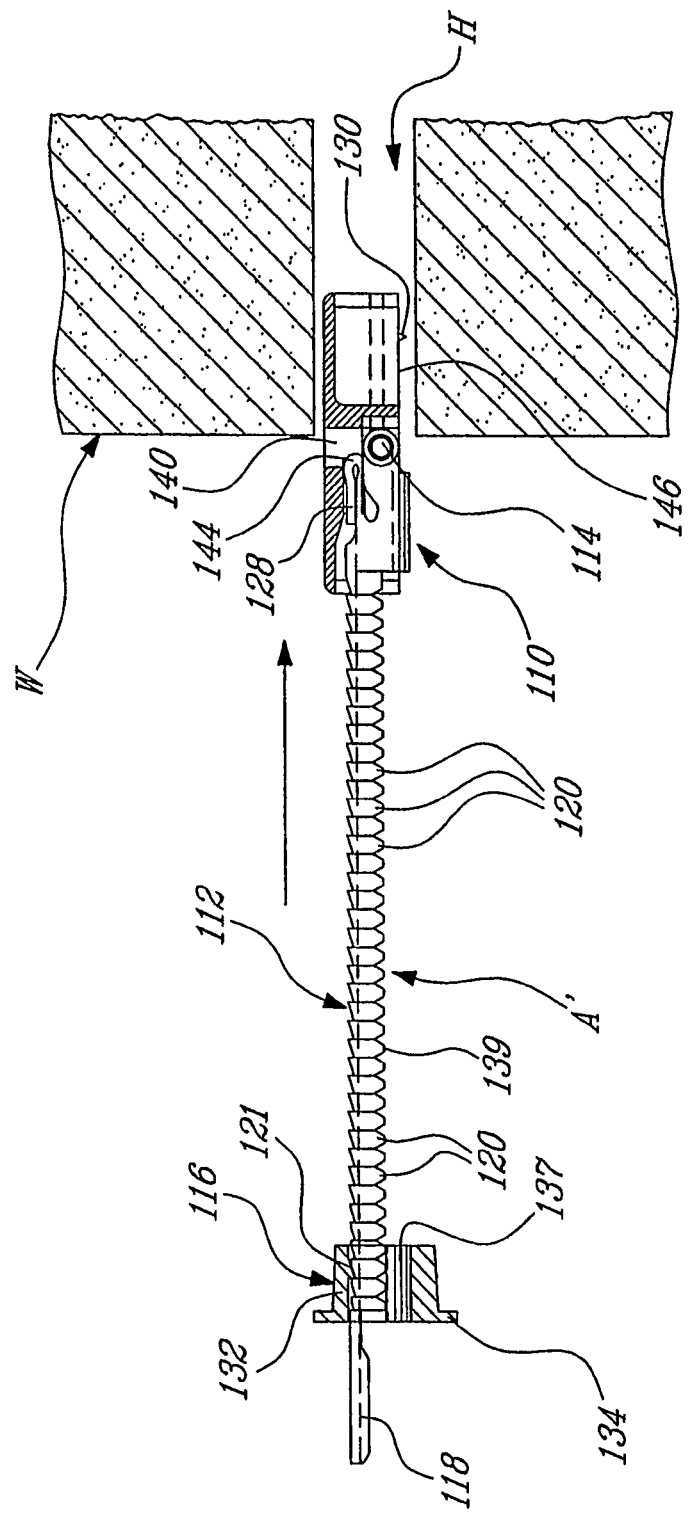

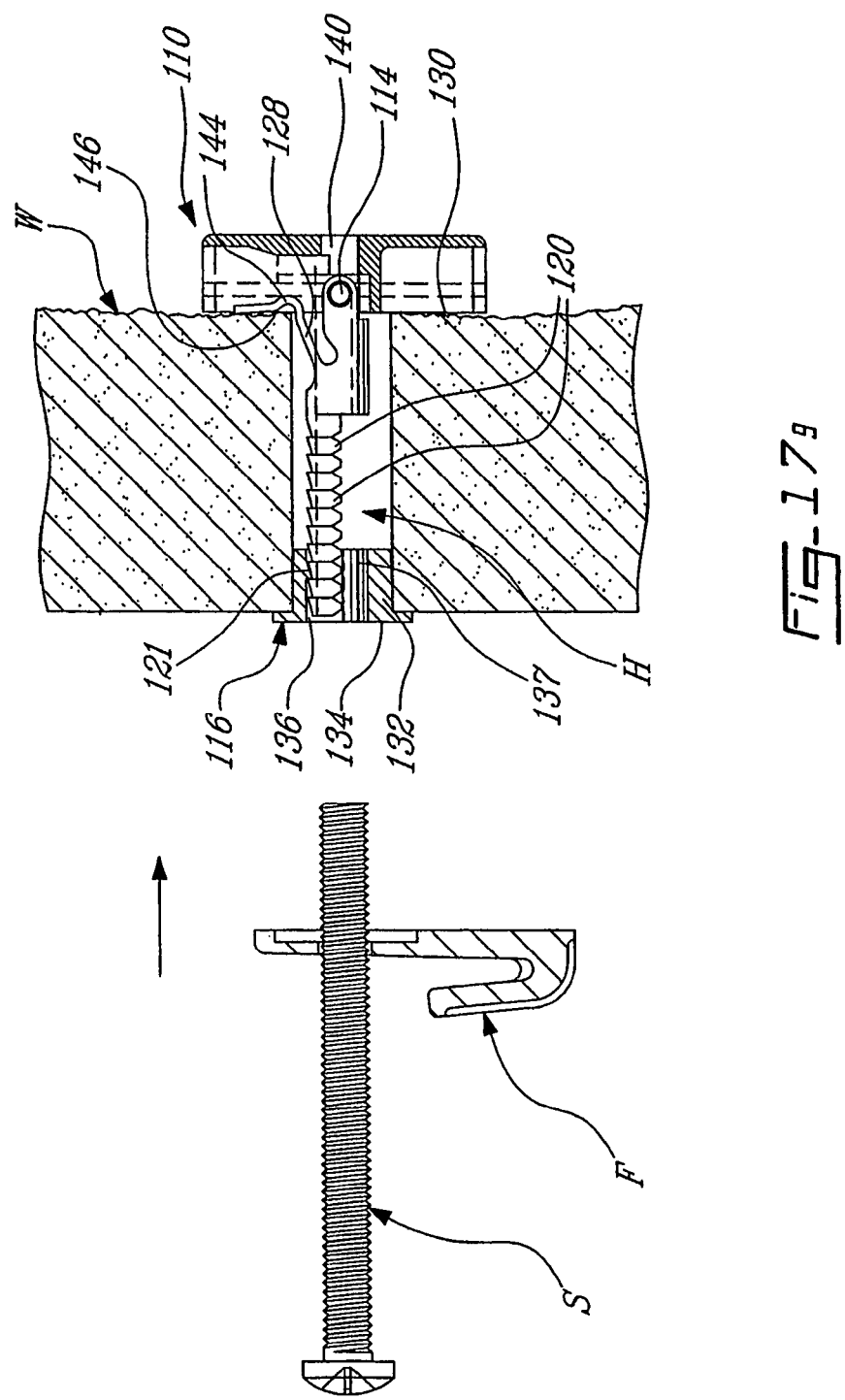

ANCHOR ASSEMBLY FOR FASTENER

CROSS REFERENCE TO RELATED APPLICATIONS

This application is a continuation of U.S. application Ser. No. 11/886,941, filed Mar. 21, 2006, now U.S. Pat. No. 8,303,224, issued Nov. 6, 2012, which is a U.S. National filing under §371 of International Application No. PCT/CA2006/000419, with an international filing date of 21 Mar. 2006, completed, claiming priority from Canadian Application No. 2,502,044 filed 21 Mar. 2005, expired, and from U.S. Provisional Application No. 60/685,498 filed 31 May 2005, and herein incorporated by reference.

FIELD OF THE INVENTION

The present invention relates to wall anchors and, more particularly, to a wall anchor for use typically in hollow walls, such as those made of friable materials, e.g. gypsum.

BACKGROUND OF THE INVENTION

U.S. Pat. No. 4,294,156 issued on Oct. 13, 1981 to McSherry et al. discloses an anchor assembly for retaining an elongated fastener within an opening defined in a wall. The anchor assembly includes a channel member acting as a toggle, and a pair of straps extending from the channel member and being pivotally mounted thereto. A pulling ring is provided at the ends of the straps opposite their ends connected to the channel member. A collar is engaged around the two straps and can be displaced, ratchet-type, towards the channel member. A hole is first defined through the wall and the channel member, oriented parallel to the straps is inserted through the hole such as to extend behind the wall, the channel member adopting once having passed the opening in the wall an orientation generally perpendicular to the straps and lying against the hidden surface of the wall after the straps have been pulled on via the pulling ring. The collar is then displaced along the straps and towards the wall until it firmly abuts the visible surface of the wall, the wall being imprisoned between the channel member and the collar which are connected by the straps. The pulling ring and the sections of the straps which extend forwardly of the collar can then be cut and a fastener can then be engaged through the collar and through a threaded opening defined in the channel member thereby allowing the fastener to be secured to the wall and to hold an article thereto.

U.S. Pat. No. 4,075,924 issued on Feb. 28, 1978 and U.S. Pat. No. 4,650,386 issued on Mar. 17, 1987, both to McSherry at al., are also of interest.

SUMMARY OF THE INVENTION

It is therefore an aim of the present invention to provide an improved anchor assembly for retaining an elongated fastener within an opening defined in a wall.

It is a further aim of the present invention to provide an improved anchor assembly for retaining an elongated fastener within an opening defined in a wall, such an anchor assembly being capable of being used with walls of various thicknesses.

Therefore, in accordance with the present invention, there is provided an anchor assembly for walls, comprising a strap member, a spring member, a toggle member pivotally mounted to said strap member, and a locking member slidable along said strap member, said toggle member being displaceable between first and second positions thereof, wherein in said first position said toggle member is substantially aligned with said strap member for insertion through a hole in the wall while biasedly engaging said spring member, wherein said toggle member once behind the wall is displaced towards said second position by said spring member, and wherein in said second position said toggle member extends behind the wall at an angle relative to said strap member with said strap member extending from said toggle member through the hole in the wall, said locking member being adapted to be displaced along said strap member and towards the wall and said toggle member, locking means being provided for preventing said locking member from being displaced away from said toggle member, whereby once the anchor is installed, said locking member and said toggle member are connected by a distal section of said strap member and imprison the wall by abutting opposed sides thereof, a proximal section of said strap member located forwardly of said locking member being adapted to be removed, said toggle member being adapted to be engaged by a fastener introduced through said locking member and through the hole in the wall.

Also in accordance with the present invention, there is provided an anchor assembly for walls, comprising a strap member, a toggle member pivotally mounted to said strap member, said strap member being provided with a single strap, and a locking member slidable along said single strap, said toggle member being displaceable between first and second positions thereof, wherein in said first position said toggle member is substantially aligned with said strap member for insertion through a hole in the wall, and wherein in said second position said toggle member extends behind the wall at an angle relative to said strap member with said strap member extending from said toggle member through the hole in the wall, said locking member being adapted to be displaced along said single strap and towards the wall and said toggle member, locking means being provided for preventing said locking member from being displaced away from said toggle member, whereby once the anchor is installed, said locking member and said toggle member are connected by a distal section of said strap member and imprison the wall by abutting opposed sides thereof, a proximal section of said strap member located forwardly of said locking member being adapted to be removed, said toggle member being adapted to be engaged by a fastener introduced through said locking member and through the hole in the wall.

Further in accordance with the present invention, there is provided an anchor assembly for walls, comprising a strap member, a toggle member pivotally mounted to said strap member, and a locking member slidable along said strap member, said toggle member having a cutting end and being displaceable between first and second positions thereof, wherein in said first position said toggle member can be engaged and driven by a rotatable tool at an end thereof opposite said cutting end such that said toggle member cuts a hole in a wall via said cutting end such as to extend through the wall, and wherein in said second position said toggle member extends behind the wall at an angle relative to said strap member with said strap member extending from said toggle member through the hole in the wall, said locking member being adapted to be displaced along said strap member and towards the wall and said toggle member, locking means being provided for preventing said locking member from being displaced away from said toggle member, whereby once the anchor is installed, said locking member and said toggle member are connected by a distal section of said strap member and imprison the wall by abutting opposed sides thereof, a proximal section of said strap member located forwardly of said locking member being adapted to be removed, said toggle member being adapted to be engaged by a fastener introduced through said locking member and through the hole in the wall.

Still further in accordance with the present invention, there is provided an anchor assembly for walls, comprising a strap member, a toggle member pivotally mounted to said strap member, and a locking member slidable along said strap member, said toggle member being displaceable between first and second positions thereof, wherein in said first position said toggle member is substantially aligned with said strap member for insertion through a hole in the wall, wherein said toggle member once behind the wall is displaced towards said second position, and wherein in said second position said toggle member extends behind the wall at an angle relative to said strap member with said strap member extending from said toggle member through the hole in the wall, said locking member being adapted to be displaced along said strap member and towards the wall and said toggle member, locking means being provided for preventing said locking member from being displaced away from said toggle member, whereby once the anchor is installed, said locking member and said toggle member are connected by a distal section of said strap member and imprison the wall by abutting opposed sides thereof, a proximal section of said strap member located forwardly of said locking member being adapted to be removed, said toggle member being adapted to be engaged by a fastener introduced through said locking member and through the hole in the wall, wherein said toggle member defines at least one straight surface adapted to bear against the wall when said anchor assembly is mounted to said wall.

BRIEF DESCRIPTION OF THE DRAWINGS

Having thus generally described the nature of the invention, reference will now be made to the accompanying drawings, showing by way of illustration a preferred embodiment thereof, and in which:

FIGS. 4 and 5 are top plan views of the anchor assembly of FIG. 1 with the toggle member shown respectively in the first and second positions thereof;

FIGS. 6 and 7 are respectively side elevational and rear elevational views of the anchor assembly of FIG. 5;

FIGS. 17a to 17i are successive partly cross-sectional schematic side views showing the installation of the anchor assembly of FIGS. 14 to 16 into a wall.

DESCRIPTION OF THE ILLUSTRATIVE EMBODIMENTS

Figure 1:
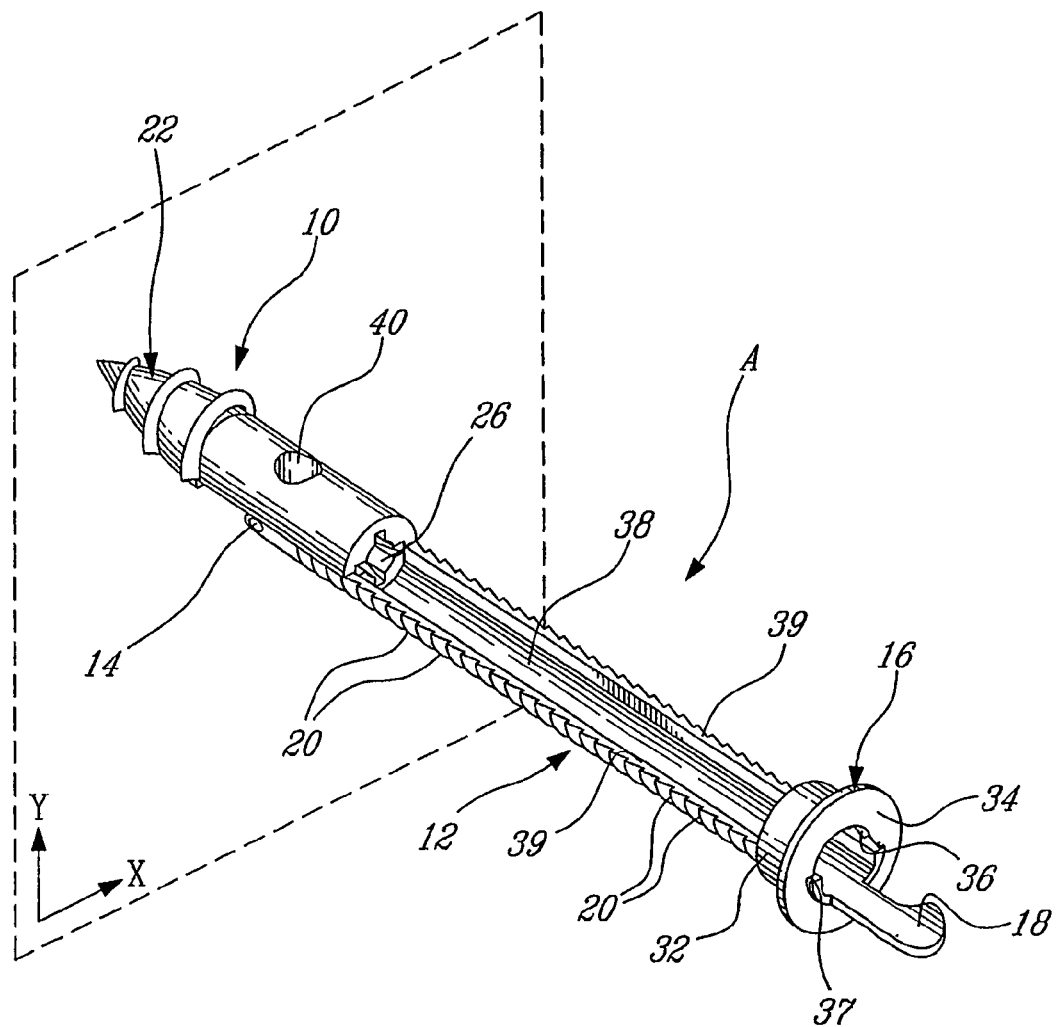
FIG. 1 is a perspective view of an anchor assembly in accordance with a first embodiment of the present invention, and showing a toggle member of the anchor assembly in a first insertion position thereof, a wall being schematically shown in phantom lines.
Figure 2:
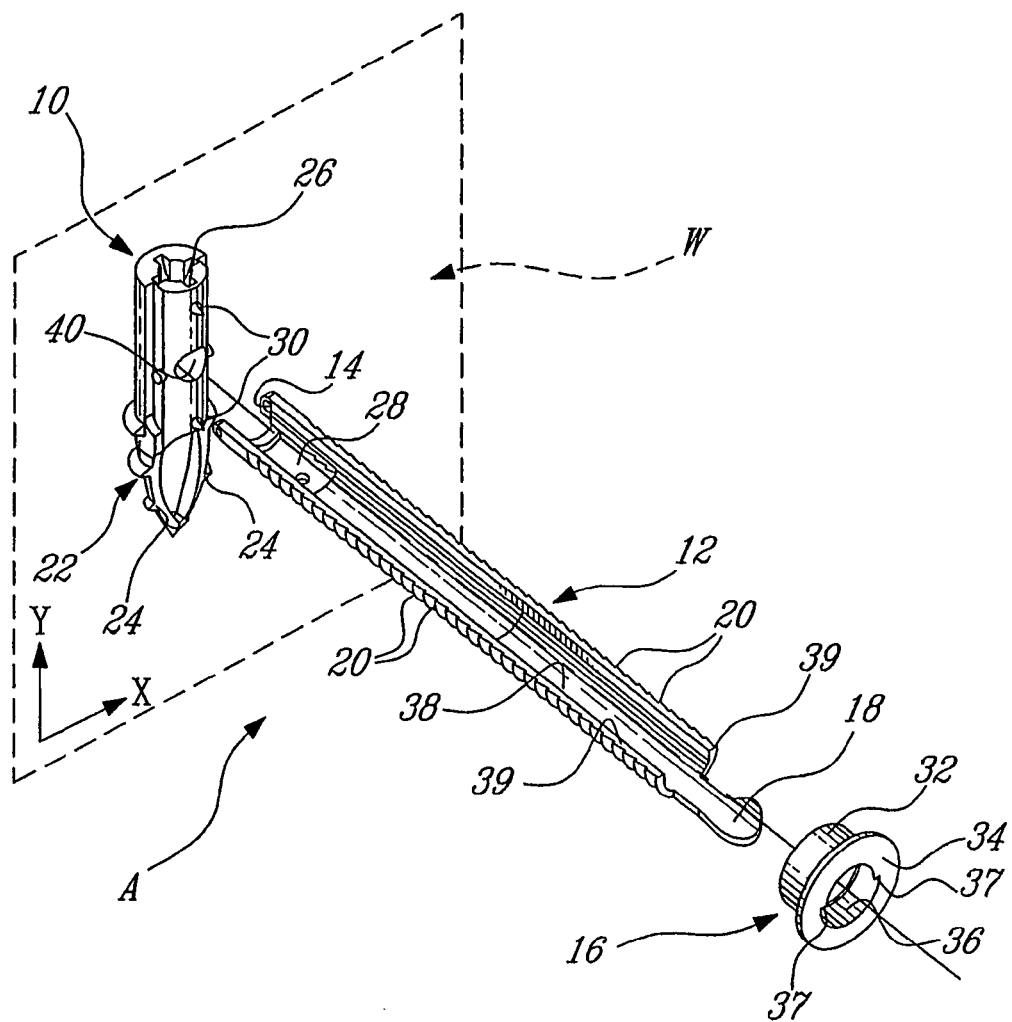
FIG. 2 is an exploded perspective view of the anchor assembly of FIG. 1, and showing the toggle member in a second retention position thereof.
Figure 3:
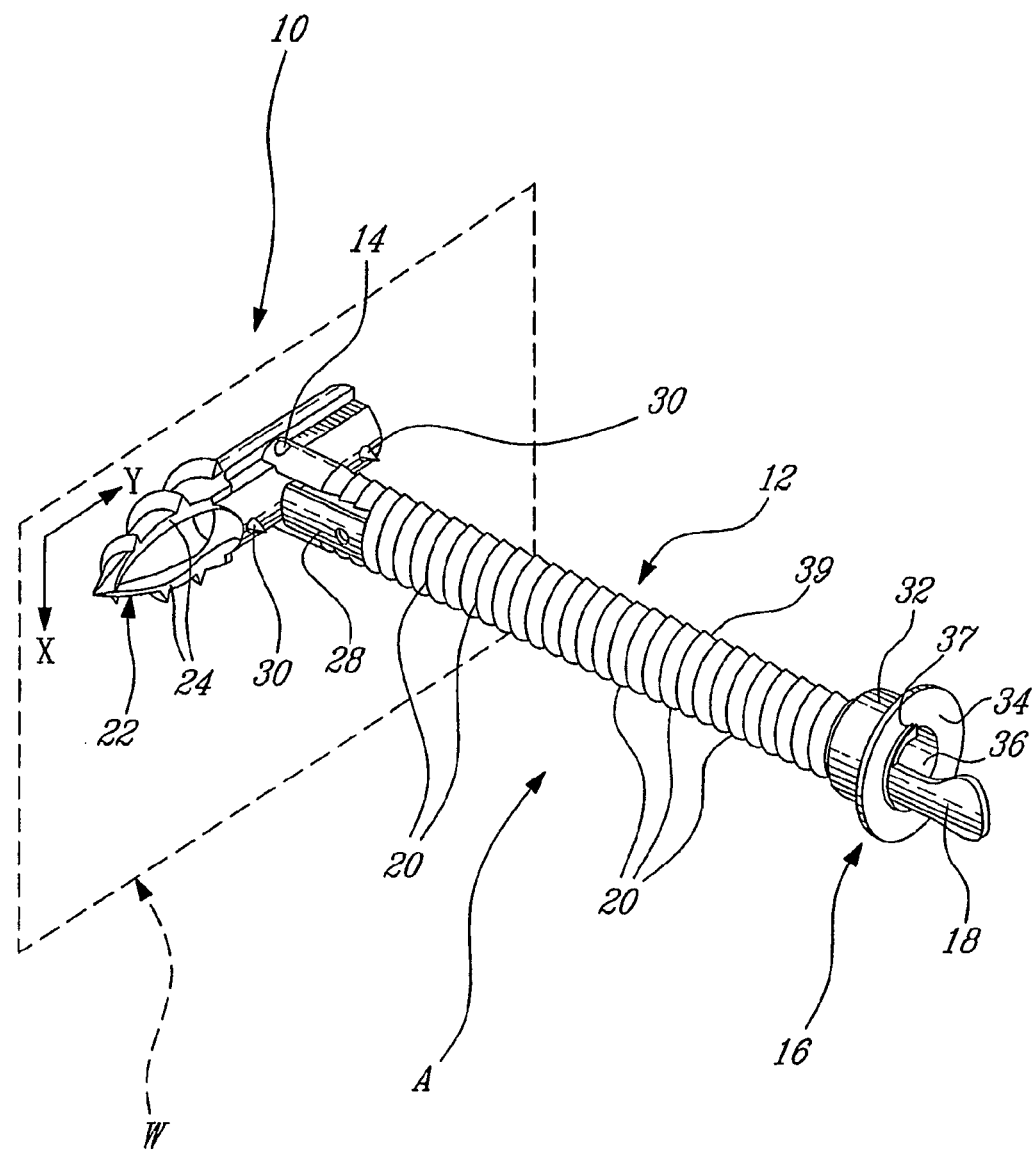
FIG. 3 is a perspective view of the anchor assembly of FIG. 1 with the toggle member shown in the second position thereof.
Figure 8:
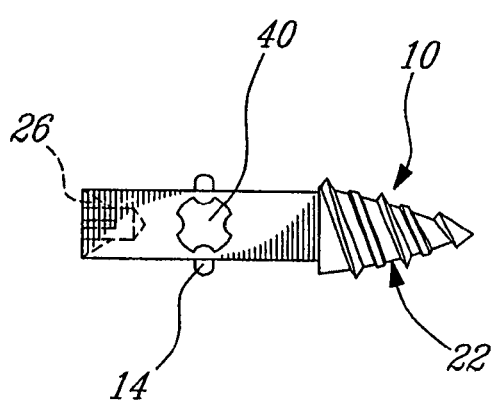
FIGS. 8 to 13 are various views of a toggle member, a strap member and a locking member of the anchor assembly.
Figure 9:
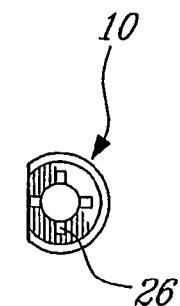
Figure 10:
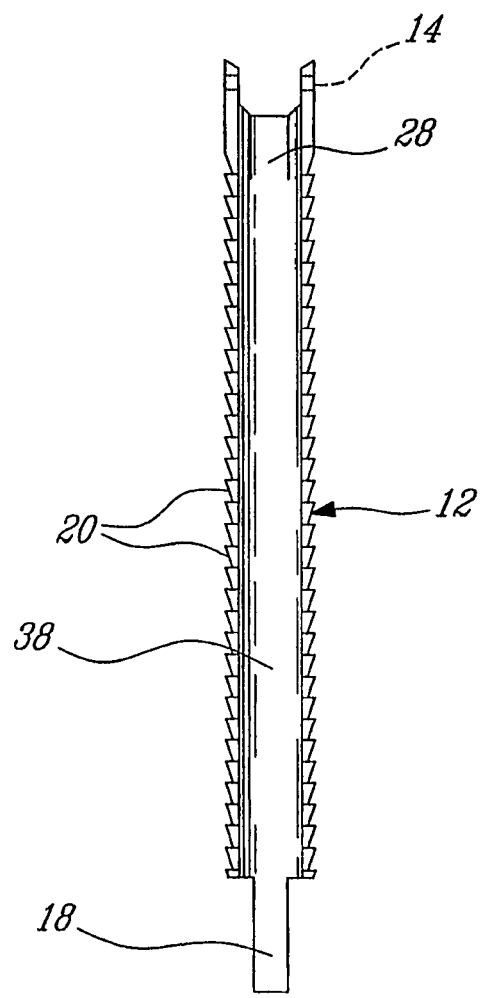
Figure 11:
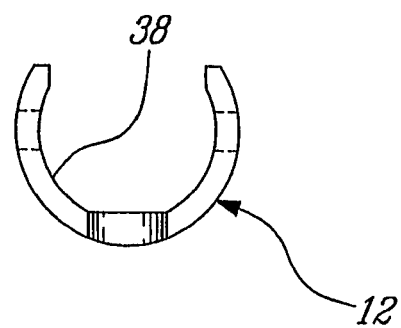
Figure 12:
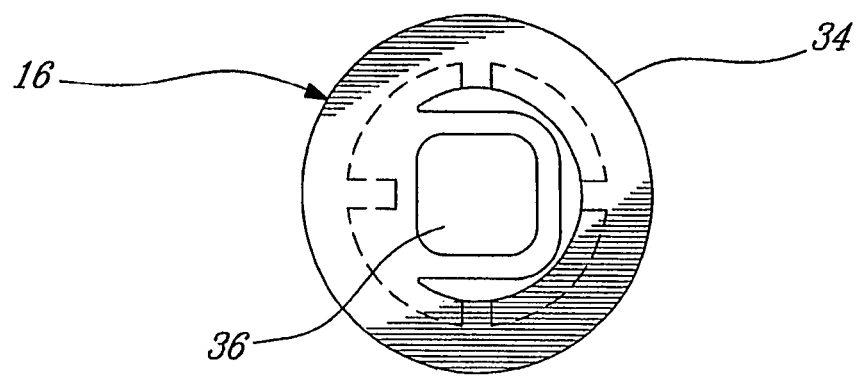
Figure 13:
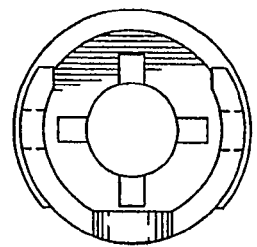

FIGS. 1 to 3 illustrate an anchor assembly A in accordance with the present invention, which is adapted to be mounted to a wall W for use with a fastener (not shown), such as a screw. The anchor assembly A comprises a cutting and retention member 10 hereinafter referred to as the toggle member 10, a strap member 12 pivotally connected at pivot 14 to the toggle member 10, and a locking member, such as collar 16. The strap member 12 is thus pivotally connected at its rear end to the toggle member 10 and is provided at its front end with a grip member 18. The strap member 12, preferably made of plastic, is of substantially semi-circular cross-section and defines a series of ratchet teeth 20 on an outside surface thereof. The collar 16 is displaceable along the strap member 12, that is only towards the toggle member 10, the collar 16 including inner locking elements 21 (FIGS. 4 to 6) which co-act with the ratchet teeth 20 in order to prevent the collar 16 from being displaced away from the toggle member 10.

The toggle member 10 defines at a leading, i.e. rear, end thereof a threaded cutting member 22 defining a pointed end and cutting edges 24 for cutting through a friable wall W material when the toggle member 10 is rotated using, for instance, a screwdriver while the toggle member 10 is in its position shown in FIG. 1, that is in a generally aligned position thereof with respect to the strap member 12. In fact, the toggle member 10 does not have to be in the aligned position at least during insertion of the threaded cutting member 22 into the wall W, and generally until the forward end of the strap member 12 abuts, or is close to, the visible side of the wall W.

Accordingly, a proximal, i.e. trailing, end of the toggle member 10 defines a cruciform recess 26 adapted to be engaged by a Phillips-type screwdriver. It is understood that other types of female recesses or even male extensions, engageable respectively by suitable screwdriver bits or by suitable rotatable sockets, could also be used.

A spring-loaded tab 28 is provided at the rear, i.e. leading, end of the strap member 12 such as to be engaged by the toggle member 10 when the latter is aligned, as in FIG. 1, with the strap member 12, such that once the toggle member 10 has been inserted completely through the wall W, the spring-loaded tab 28 biasedly releases the toggle member 10 to its transversal retention position shown in FIG. 2. The toggle member 10 also includes pointed teeth 30 adapted to engage the hidden side of the wall W when the strap member 12 is pulled on.

Accordingly, when it is desired to install the anchor assembly A in the wall W, the toggle member 10 is substantially brought into alignment with the strap member 12, as shown in FIG. 1. Then, a suitable tool, such as a screwdriver or a power driven screwdriver bit, is engaged in the cruciform recess 26 of the toggle member 10 and is then rotated such that the cutting member 22 of the toggle member 10 defines a hole in the wall W. Once the toggle member 10 has been inserted completely through the wall W, the spring-loaded tab 28 of the strap member 12 swings the toggle member 10 to its transversal position shown in FIGS. 2 and 3, that is generally perpendicular to the strap member 12.

The strap member 12 is then pulled away from the wall W, such that the pointed teeth 30 of the toggle member 10 engage the hidden surface of the wall W. The collar 16 is then slid towards the wall W along the ratchet teeth 20 of the strap member 12 that is until a skirt 32 of the collar 16 is inserted in the hole defined in the wall W, and a flange 34 of the collar 16 abuts the visible side of the wall W. The grip member 18 is held onto by the user while the collar 16 is displaced towards the wall W. The collar 16 is slid longitudinally along the strap member 12, and without being able to rotate with respect to the strap member 12 as a result of the non-circular opening 36 defined in the collar 18, which defines shoulders 37 (FIGS. 1 to 3) that are engaged by the longitudinal edges 39 of the strap member 12, as best seen in FIG. 1.

Once the wall W is firmly imprisoned between the toggle member 10 and the collar 16, the grip member 18 and the section of the strap member 12 extending between the grip member 18 and the flange 34 of the collar 16, can be discarded, for instance, by cutting or, as in the present embodiment, by bending as the strap member 12 is provided with weakened areas which allow the strap member 12 to be separated in two. The remaining portion of the strap 12 thus connects the toggle member 10 to the collar 16 within the hole in the wall W.

A fastener can then be engaged through the central opening 36 defined in the collar 16, within a semi-circular channel 38 defined longitudinally along the strap member 12, and through an opening 40 defined in the toggle member 10. The opening 40 in the toggle member 10 may be, for instance, tapped by the fastener such that the fastener becomes firmly secured to the anchor assembly A which itself is firmly secured to the wall W, as explained hereinabove. If the opening 40 is provided with a machine tap, a bolt can be used as the fastener. If the fastener is provided at its head, for instance, with a hook, the anchor assembly A can be used in a ceiling.

Figure 14:
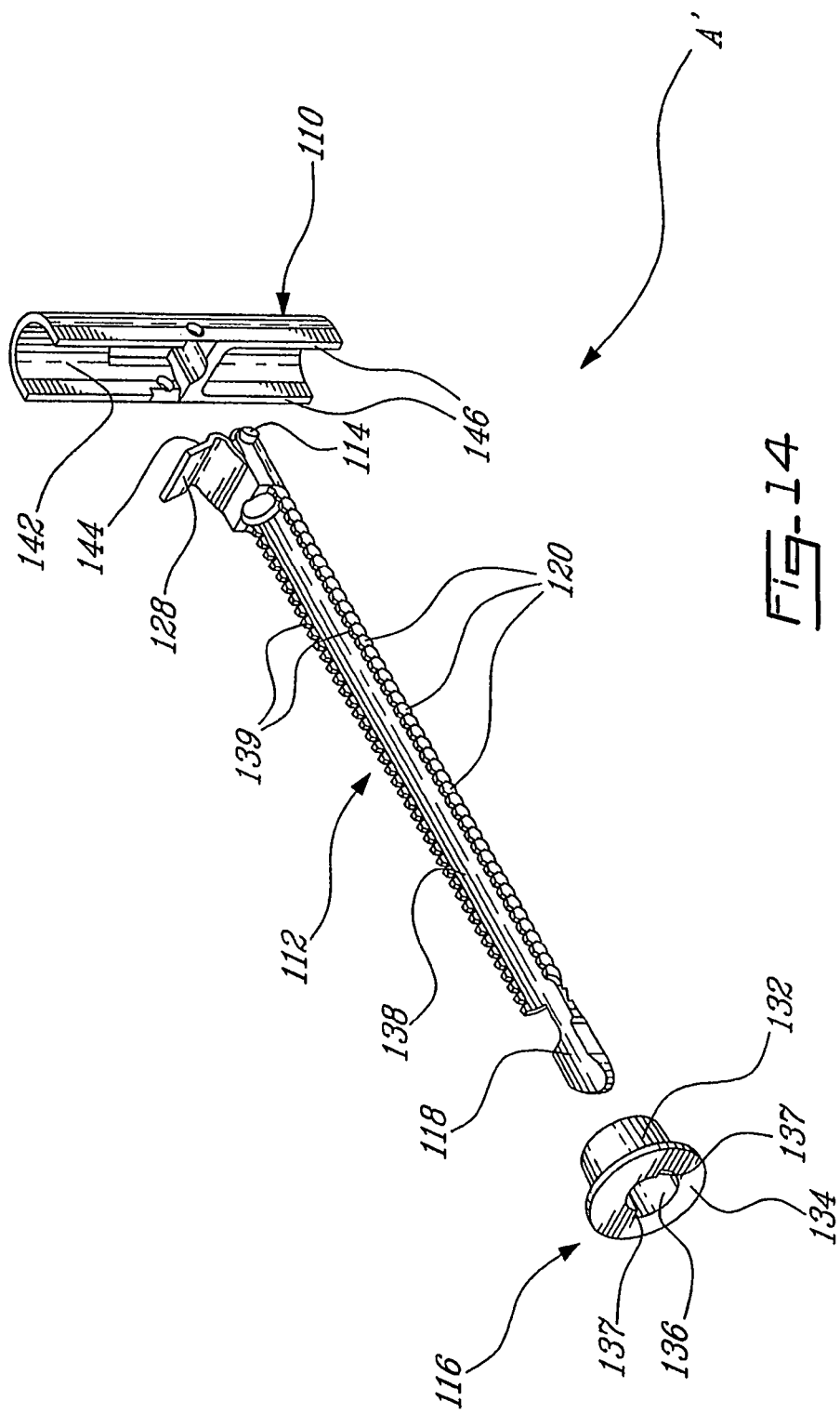
FIG. 14 is an exploded perspective view of an anchor assembly in accordance with a second embodiment of the present invention, and showing a toggle member of the anchor assembly in a retention position thereof.
Figure 15:
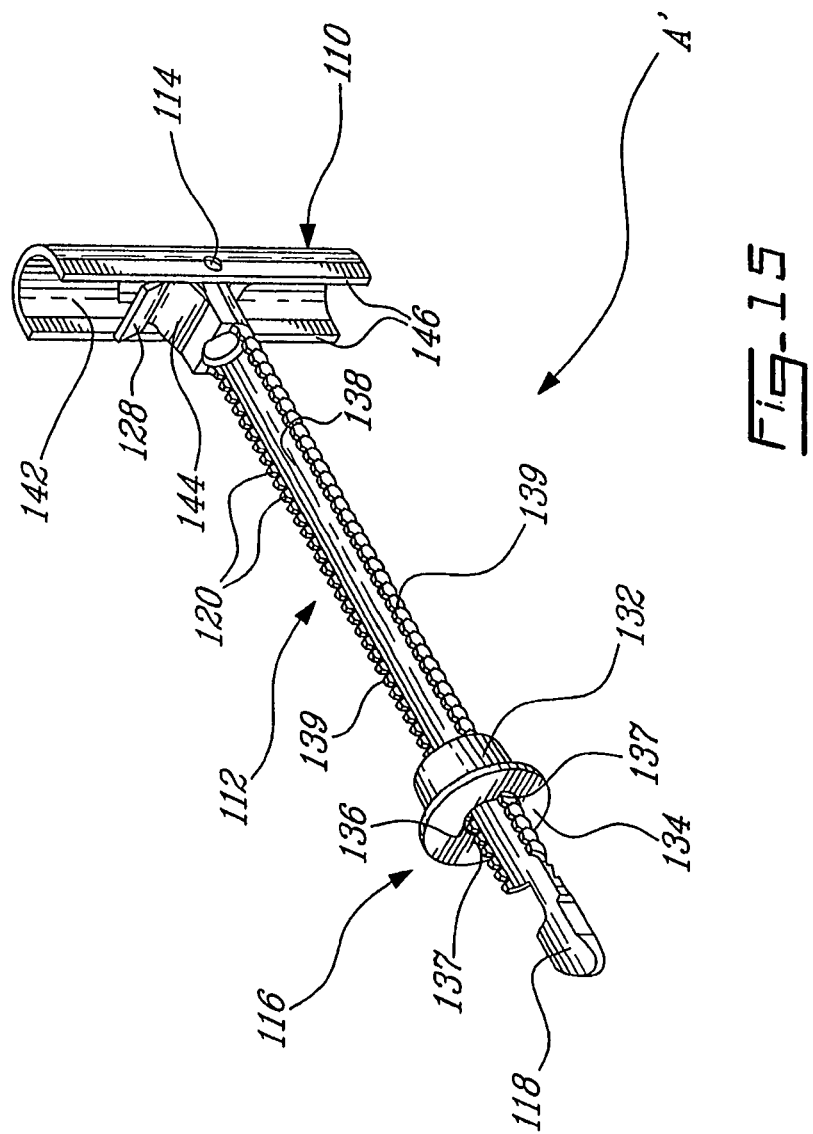
FIG. 15 is a perspective view of the anchor assembly of FIG. 14, and with the toggle member shown in the retention position thereof.
Figure 16:
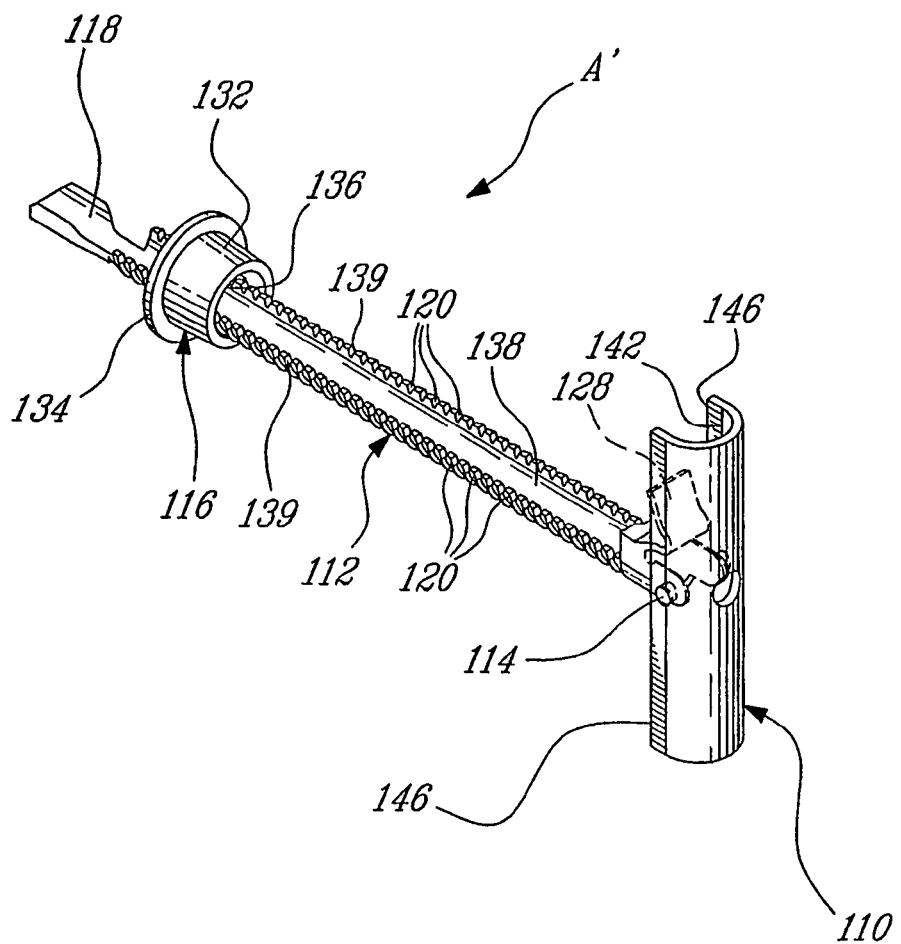
FIG. 16 is a further perspective view of the anchor assembly of FIG. 14 and with the toggle member shown in the second position thereof.

Also in accordance with the present invention, FIGS. 14 to 16 illustrate a variant anchor assembly A', which is similar to the anchor assembly A of FIG. 1, whereby in the following description and drawings that pertain thereto, components of anchor assembly A' which are identical in function and identical and/or similar in structure to corresponding components of anchor assembly A of FIG. 1 (and FIGS. 2 to 13) bear the same reference as in FIG. 1 (and FIGS. 2 to 13), but are tagged with the prefix "1" and are thus in the hundreds with the last two digits thereof being identical to the reference numerals of corresponding components of anchor assembly A. New components (or components not identified for anchor assembly A) provided in anchor assembly A' start at reference numeral 142.

Generally, both anchor assemblies A and A' are very similar, except for their toggle members, as explained hereinbelow. The anchor assembly A' is also adapted to be mounted to a wall for use with a fastener (not shown), such as a screw. The anchor assembly A' comprises a retention member 110 hereinafter referred to as the toggle member 110, a strap member 112 pivotally connected at pivot 114 to the toggle member 110, and a locking member, such as collar 116. The strap member 112 is thus pivotally connected at its rear, leading, end to the toggle member 110 and is provided at its front end with a grip member 118.

The strap member 112, preferably made of plastic, is of substantially semi-circular cross-section and defines a series of ratchet teeth 120 on an outside surface thereof. The collar 116 is displaceable along the strap member 112, that is only towards the toggle member 110, the collar 116 including inner locking elements (not shown) which co-act with the ratchet teeth 120 in order to prevent the collar 116 from being displaced away from the toggle member 110, i.e. from being retracted back towards the grip member 118.

The toggle member 110, as opposed to the toggle member 10 of the anchor assembly A of FIG. 1, does not define at a leading end thereof a threaded cutting member. Therefore, in the case of the anchor assembly A', a hole must be formed, e.g. drilled, through the wall before the anchor assembly A' can be mounted thereto, as will be explained in more detail hereinafter. The toggle member 110 is of C-shaped cross-section such that an open side 142 thereof faces the collar 116, when the toggle member 110 is in the transversal retention position thereof shown in FIGS. 14 to 16.

A spring-loaded tab 128 is provided at the rear, i.e. leading, end of the strap member 112 such as to be engaged by the toggle member 110 when the latter is aligned with the strap member 112 (this position is generally shown in FIG. 1 with respect to anchor assembly A). Therefore, with the toggle member 110 and the strap member 112 in such a generally aligned insertion position, the toggle member 110 can be inserted through the wall.

Once the toggle member 110 has been introduced completely past the hidden surface of the wall, the spring-loaded tab 128 biasedly releases the toggle member 110 to its transversal retention position shown in FIGS. 14 to 16. The tab 128 includes a V-shaped tongue 144 that is forcibly folded or collapsed when the toggle member 110 is brought to the insertion position and that causes, as it plastically returns to its at-rest position (see FIGS. 14 to 16) the toggle member 110 to displace to its transversal retention position. Parallel and more importantly co-planar linear edges 148 of the toggle member 110 are adapted to bearably engage the hidden side of the wall when the strap member 112 is pulled on.

Figure 17A:
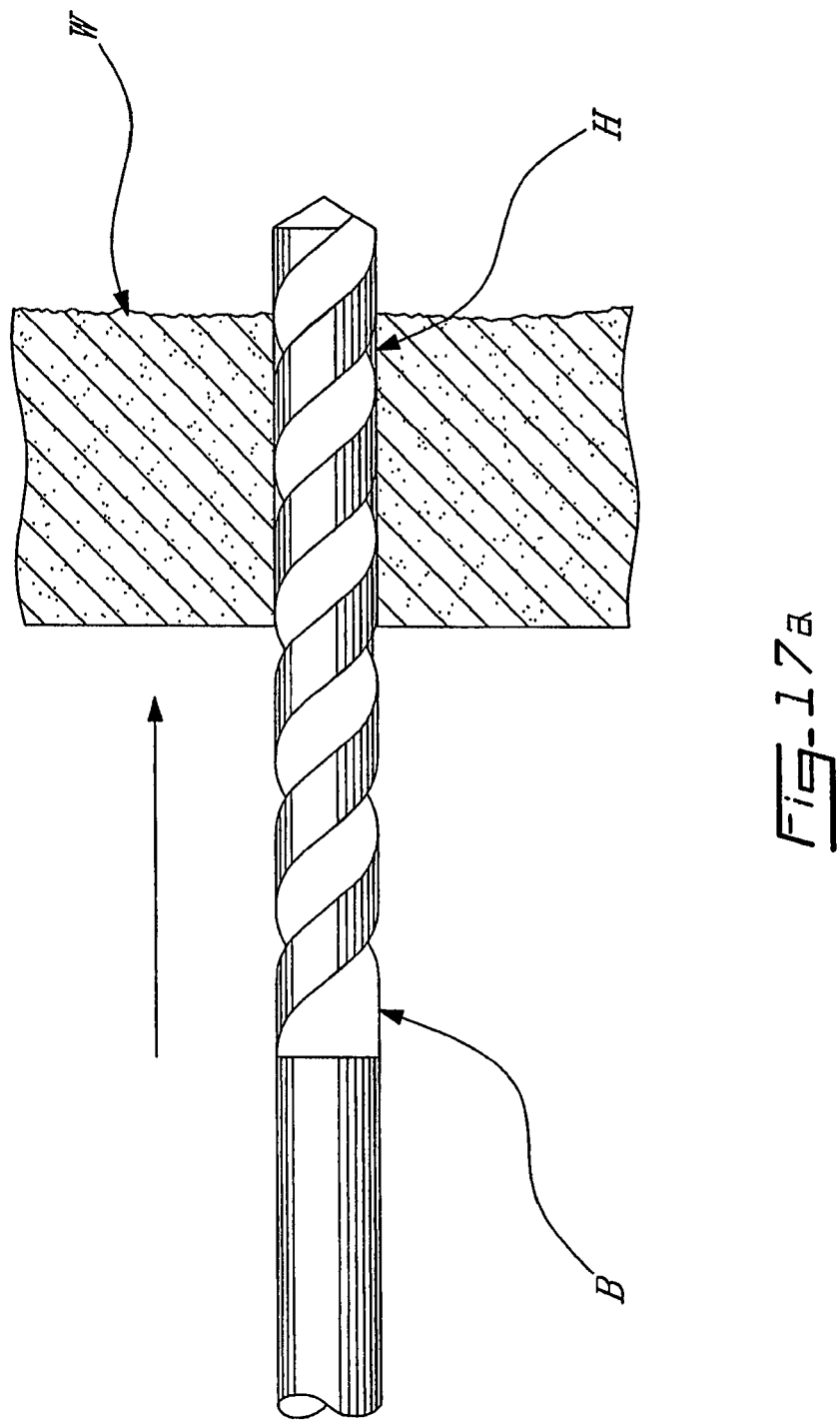
Figure 17B:
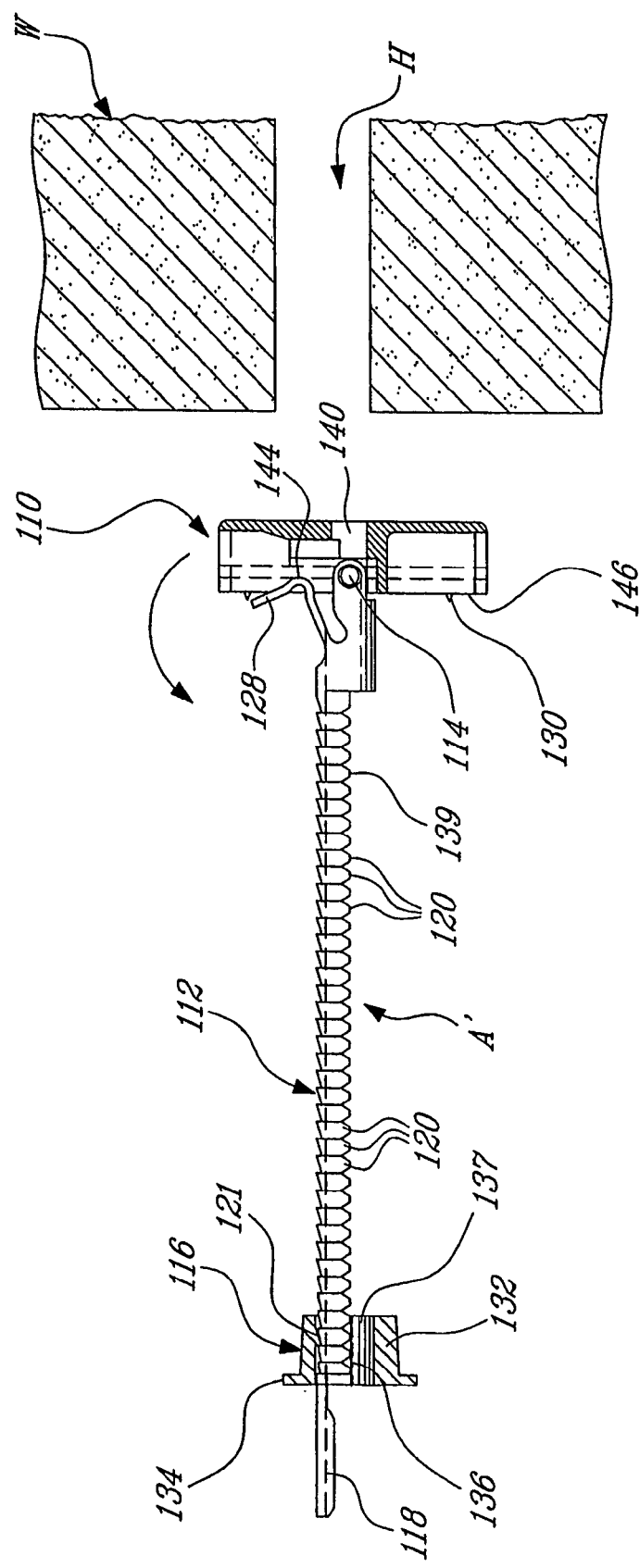
Figure 17D:
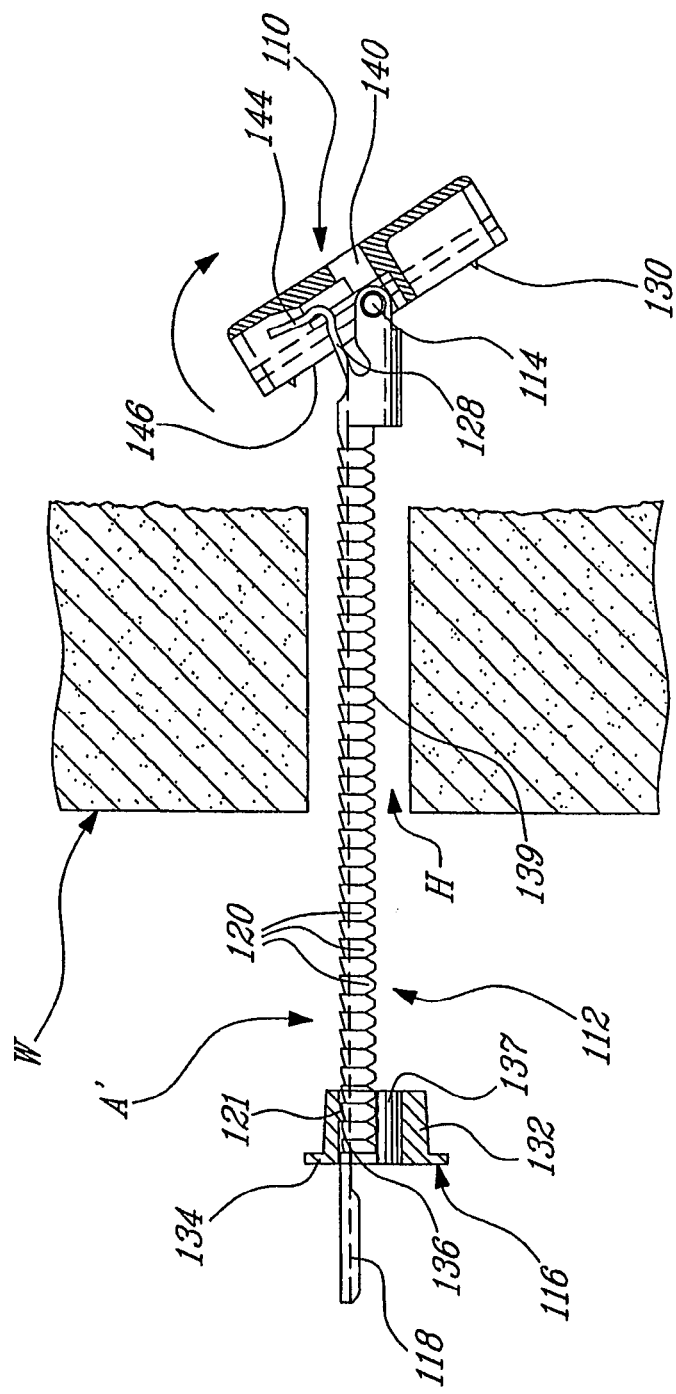

Accordingly, with reference to FIGS. 17a to 17i, when it is desired to install the anchor assembly A' in the wall W, a hole H is first formed through the wall W, using for instance a screwdriver bit B (see FIG. 17a). The toggle member 110 is then substantially brought into alignment with the strap member 112 (as seen in FIG. 17b), against the bias of the spring-loaded tab 128, and is inserted completely through the wall W (see FIGS. 17c and 17d). In FIG. 17d, the spring-loaded tab 128 of the strap member 112 swings the toggle member 110 to its transversal retention position shown in FIGS. 14 to 16, that is generally perpendicular to the strap member 112.

Figure 17E:
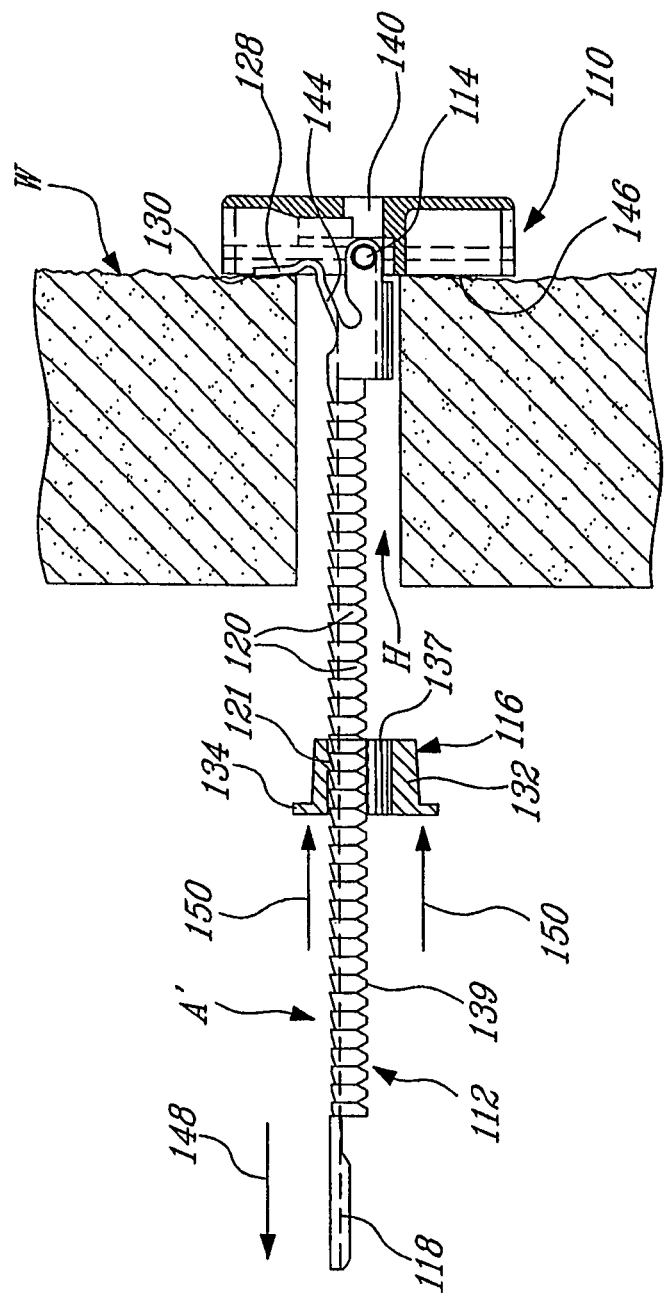
Figure 17F:
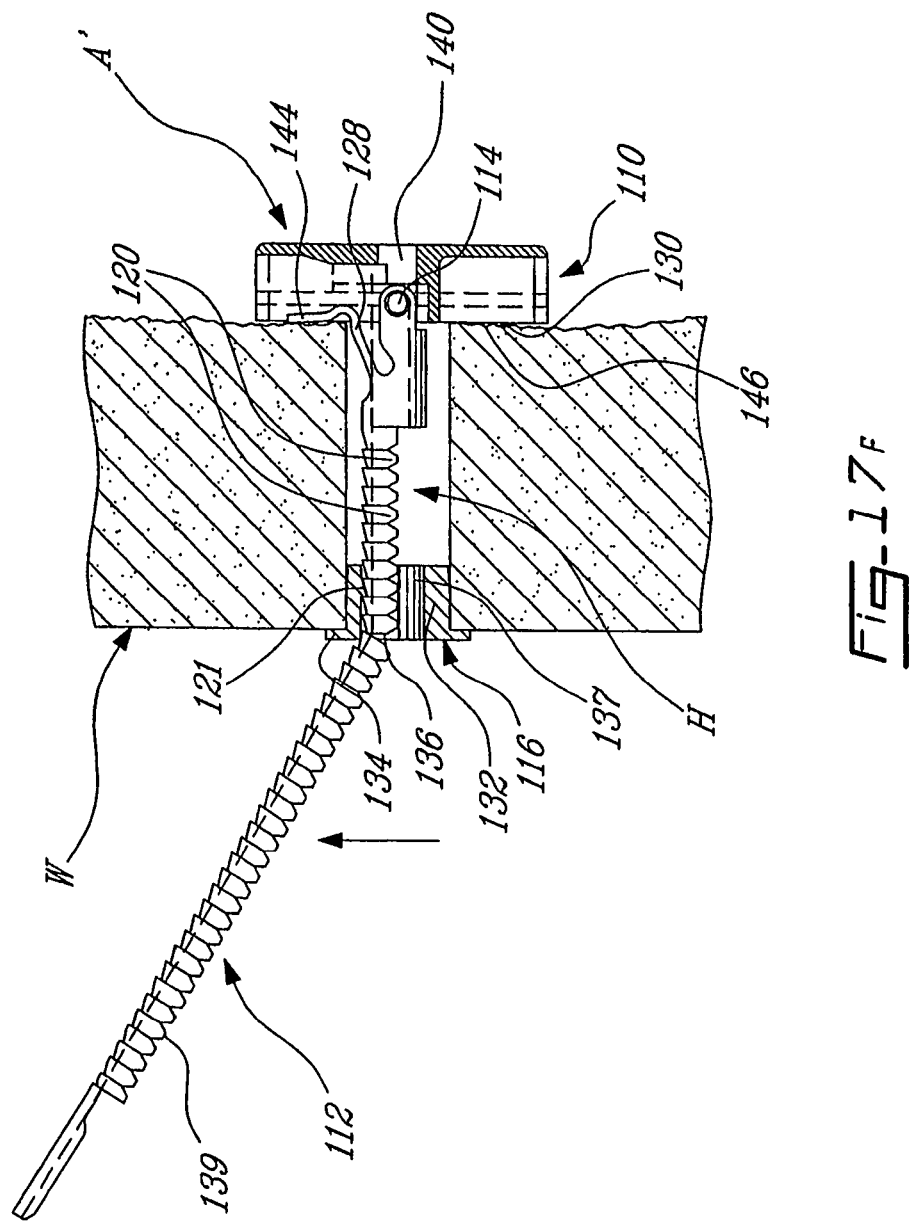

The strap member 112 is then pulled away from the wall W, along arrow 148 in FIG. 17e, such that the linear edges 146 of the toggle member 110 engage the hidden surface of the wall W. The collar 116 is then slid, along arrows 150 (FIG. 17e) towards the wall W and the toggle member 110, along the ratchet teeth 120 of the strap member 112, that is until a skirt 132 of the collar 116 is inserted in the hole H defined in the wall W and a flange 134 of the collar 116 abuts the visible side of the wall W. The grip member 118 is held onto by the user while the collar 116 is displaced towards the wall W. The collar 116 is slid longitudinally along the strap member 112, and without being able to rotate with respect to the strap member 112 as a result of the non-circular opening 136 defined in the collar 116, which defines shoulders 137 (see FIGS. 14 and 15) that are engaged by longitudinal edges 139 of the strap member 112, as best seen in FIG. 15.

Once the wall W is firmly imprisoned between the toggle member 110 and the collar 116, the grip member 118 and the section of the strap member 112 extending between the grip member 118 and the flange 134 of the collar 116, can be discarded, for instance, by cutting or, as in the present embodiment, by bending (see FIG. 17f) as the strap member 112 is provided with weakened areas which allow the strap member 112 to be separated in two. As shown in FIG. 17g, the remaining portion of the strap 112 thus connects the toggle member 110 to the collar 116 within the hole H in the wall W.

Figure 17H:
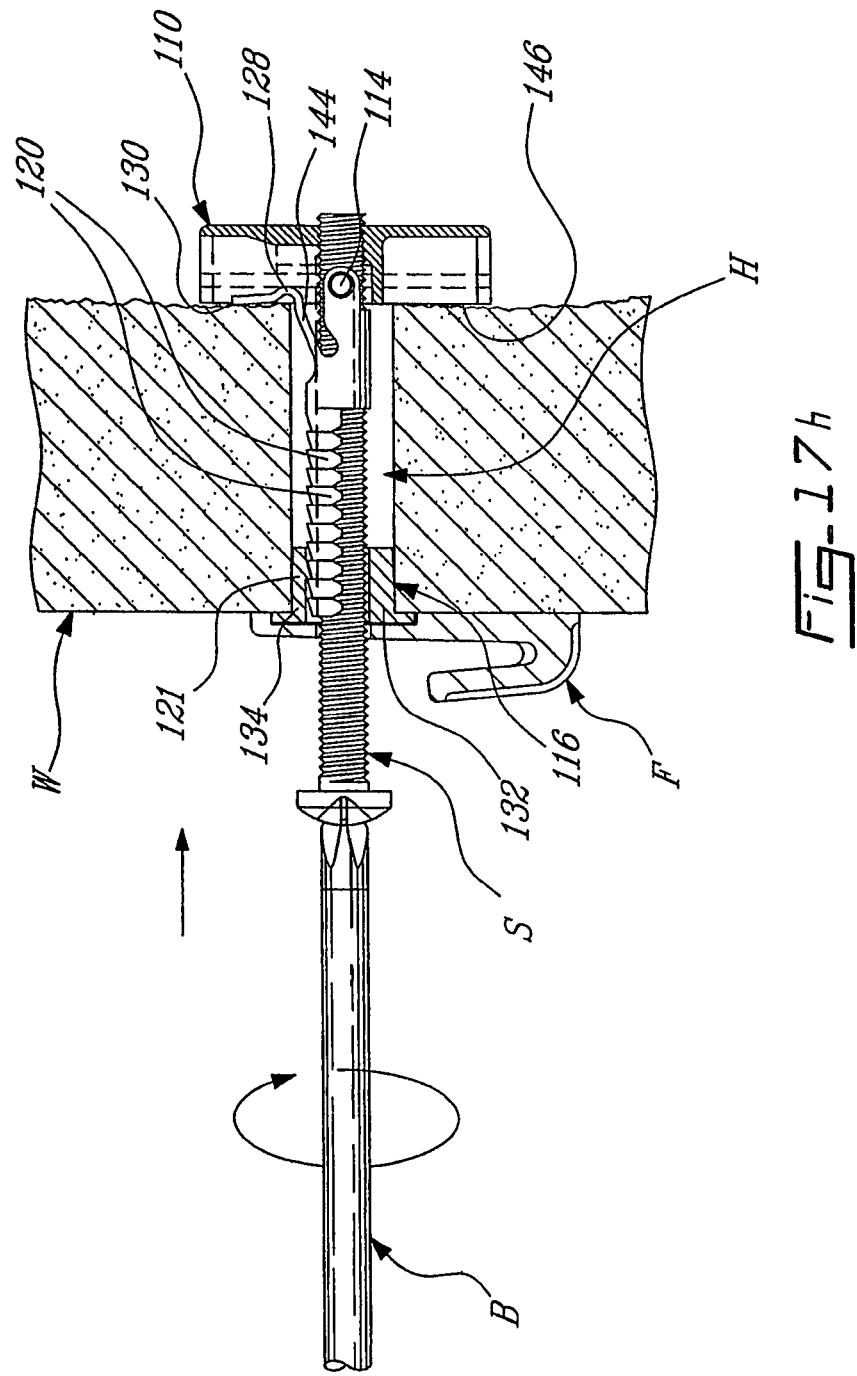
Figure 17I:
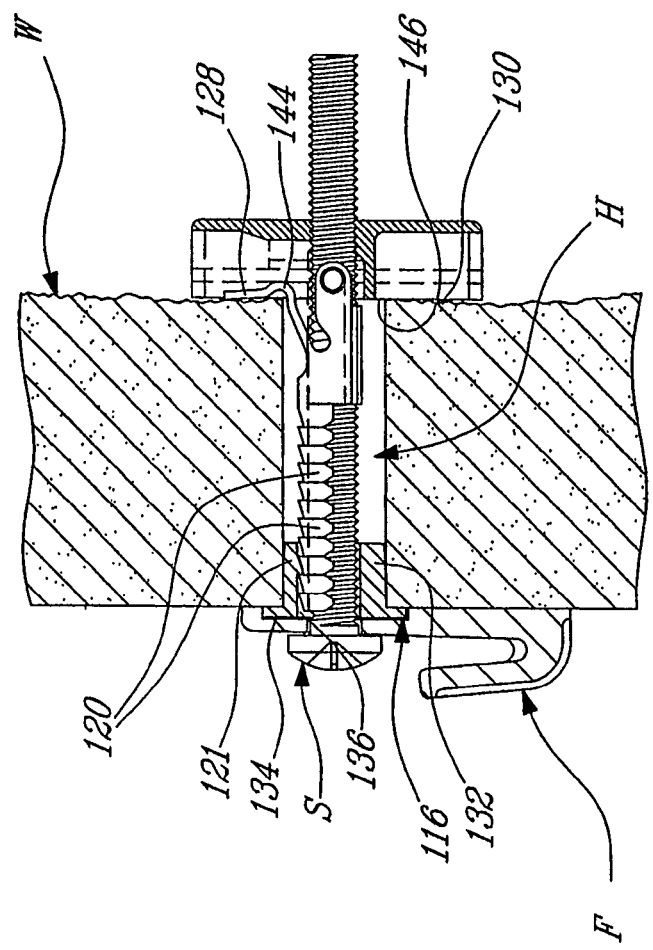

Still referring to FIG. 17g, a fastener, such as a screw or a bolt S, can then be engaged through the central opening 136 defined in the collar 116, within a semi-circular channel 138 defined longitudinally along the strap member 112, and through an opening 140 defined in the toggle member 110. This opening 140 in the toggle member 110 may be, for instance, tapped by the fastener such that the fastener becomes firmly secured to the anchor assembly A' which itself is firmly secured to the wall W, as explained hereinabove. If the opening 140 defines a machine tap (as in FIGS. 17a to 17i), the bolt S can be used as the fastener. If the fastener is provided at its head, for instance, with a hook, the anchor assembly A' can be used in a ceiling. Here, the bolt S is used to mount a hook fixture F to the wall W, as seen in FIGS. 17g to 17h.

Although the present invention has been described hereinabove by way of specific embodiments thereof, it can be modified, without departing from the spirit and nature of the subject invention as defined in the appended claims.

What is claimed is:

1. An anchor assembly for walls, comprising a strap member, a spring member, a toggle member pivotally mounted to said strap member, said strap member being provided with a single strap, and a locking member slidable along said single strap, said toggle member being displaceable between first and second positions thereof, wherein in said first position said toggle member is substantially aligned with said strap member for insertion through a hole in the wall while biasedly engaging said spring member, and wherein in said second position said toggle member extends behind the wall at an angle relative to said strap member with said strap member extending from said toggle member through the hole in the wall, said locking member being adapted to be displaced along said single strap and towards the wall and said toggle member, whereby once the anchor is installed, said locking member and said toggle member are connected by a distal section of said strap member and imprison the wall by abutting opposed sides thereof, wherein said spring member comprises a substantially V-shaped element having an apex thereof facing towards said toggle member when in said second position thereof.

2. An anchor assembly as defined in claim 1, wherein said single strap defines a series of successive ratchet-type teeth, said locking member having at least one locking element adapted to co-act with said teeth for preventing said locking member from being displaced away from said toggle member.

3. An anchor assembly as defined in claim 2, wherein said locking member includes a proximal flange and a skirt depending from said flange, said locking member defining a non-circular opening with said single strap extending therethrough, said single strap having a cross-section such that said locking member is unable to rotate around said single strap and is thus restricted to translational displacements thereal-ong.

4. An anchor assembly as defined in claim 3, wherein said non-circular opening is delimited by a pair of shoulders, engaged by respective longitudinal edges of said single strap thereby preventing relative rotation therebetween.

5. An anchor assembly as defined in claim 1, wherein locking means are provided for preventing said locking member from being displaced away from said toggle member.

6. An anchor assembly as defined in claim 1, wherein a proximal section of said strap member located forwardly of said locking member is adapted to be removed.

7. An anchor assembly as defined in claim 1, wherein said toggle member is adapted to be engaged by a fastener introduced through said locking member and through the hole in the wall.

8. An anchor assembly as defined in claim 1, wherein said toggle member once behind the wall is displaced towards said second position by said spring member.

9. An anchor assembly as defined in claim 1, wherein said spring member is integral to said strap member.

* * * * *